United States Patent [19]
Roselle et al.

[11] 3,843,877
[45] Oct. 22, 1974

[54] AIR DATA COMPUTER INCLUDING DC TO SYNCHRO SIGNAL CONVERTER

[75] Inventors: Pierce C. Roselle, Phoenix; David G. Evans, Tempe; Vaughn R. Bussma, Phoenix, all of Ariz.

[73] Assignee: Sperry Rand Corporation, New York, N.Y.

[22] Filed: Feb. 6, 1973

[21] Appl. No.: 330,164

[52] U.S. Cl......... 235/189, 235/150.27, 340/347 SY
[51] Int. Cl.............................................. G06g 7/22
[58] Field of Search...... 235/186, 189, 183, 150.26, 235/150.27; 340/347 NT, 347 SY; 318/592, 593, 594, 595

[56] References Cited

UNITED STATES PATENTS

| | | | |
|---|---|---|---|
| 3,223,830 | 12/1965 | Evans | 340/347 SY X |
| 3,651,514 | 3/1972 | Klatt | 340/347 SY |
| 3,710,374 | 1/1973 | Kelly | 235/183 X |
| 3,713,141 | 1/1973 | Higgins | 340/347 SY |

*Primary Examiner*—Joseph F. Ruggiero
*Attorney, Agent, or Firm*—Howard P. Terry

[57] ABSTRACT

A vibratory type air data sensor, for example an altitude sensor, provides an output signal having a frequency which varies in accordance with altitude, which output in turn is converted into a d.c. signal which varies proportionally with altitude. The ratio of this variable d.c. voltage to a reference d.c. voltage is converted to a time period ratio by utilizing an oscillator to generate a reference a.c. time base and a counter and integrator means for determining the time period ratioed with the reference time base. This time period ratio is used to sample the oscillator to obtain signals proportional to the sine and cosine values of the a.c. time base which may then be converted to conventional resolver or three-wire synchro signal altitude data. A second oscillator, controlled by the counter means and having a frequency which bears a predetermined ratio to the timing oscillator may also be sampled by the time period ratio and the sine and cosine values thereof converted to conventional resolver format or three-wire synchro signal format bearing said ratio to the first synchro signal output. Fine and coarse synchro signal altitude data is thus obtained. Further, counter means synchronized to the reference oscillator and the first mentioned counter is employed to provide digital data proportional to the variable d.c. altitude signal for conversion to altitude reporting signal format.

22 Claims, 7 Drawing Figures

PATENTED OCT 22 1974 3,843,877

SHEET 1 OF 6

AIR DATA COMPUTER INCLUDING DC TO SYNCHRO SIGNAL CONVERTER

BACKGROUND OF THE INVENTION

1. Field of the Invention

The present invention relates generally to direct current-to-synchro or resolver signal conversion arrangements and more specifically to such an arrangement for use in air data computers for aircraft for converting a d.c. signal proportional to altitude to fine and coarse synchro signal format. Further means are provided for converting said d.c. altitude signal to digital format for use in generating a specially coded signal for altitude reporting purposes.

One of the primary outputs of an air data computer system for aircraft is a measure of the aircraft's altitude since it is a primary navigation flight control term. In many cases the systems utilizing the altitude data require that it be in three-wire synchro signal format or four-wire synchro resolver format. Also, in recent years federal air traffic control regulations require commercial carriers to be equipped with apparatus whereby when "interrogated" by ATC, a signal proportional to the aircraft's altitude be automatically transmitted to the ATC and displayed adjacent the ATC's "blip" display of the interrogated aircraft. This is referred to as altitude reporting. For this purpose the altitude signal must also be converted into digitally coded format, i.e., the International (ICAO) Altitude Reporting Code which is the Moa Gilam code. This code is disclosed in a publication entitled "Mark 2 Subsonic Air Data System" issued Feb. 15, 1968, page 55, published by ARINC, Annapolis, Maryland.

2. Description of the Prior Art

In the past many air data computers supplied altitude data sensed by an aneroid bellows which through an analog servo system provided a measure of altitude as a mechanical shaft position to which fine and coarse synchro transmitters were attached for transmitting such data to remote utilization apparatus. In recent years however, with increasing demands for high reliability and light weight, analog servo systems are giving way to all solid state systems utilizing digital or quasidigital techniques. For example, pressure sensors have been developed which provide outputs easily adapted to such digital techniques. One such device is disclosed in Applicant's Assignee's U.S. Pat. 3,456,508 to R. H. Frische wherein a high Q vibrating diaphragm subject to pressure altitude operates as a closed loop oscillator and supplies an electrical output having a frequency which varies in accordance therewith. In accordance with the teachings of the present invention it is this altitude sensor signal that is converted to three-wire fine/-coarse synchro data for driving, for example, the aircraft's altimeter or other altitude utilization apparatus. A further converter digitizes this signal for conversion to the Moa Gilam altitude reporting code.

SUMMARY OF THE INVENTION

In general, the vibrating diphragm pressure sensor provides an output frequency which varies in accordance with altitude, the pressure/frequency relation being inherently but predeterminedly non-linear, as shown in the above-referenced Frische patent. This frequency signal is converted to a corresponding d.c. signal and linearized with altitude by means of a feedback circuit including a function generator having the said predetermined function characteristic. The magnitude of the d.c. signal proportional to instantaneous altitude is ratioed with a reference d.c. signal whose magnitude is proportional to "full scale" altitude, i.e., maximum indicated altitude, and converted to a corresponding time period ratio using a dual slope integrator controlled by a time reference.

The basic timing reference for the system comprises a sine/cosine oscillator of a predetermined convenient frequency, the sine wave output being used as the timing reference. This oscillator also provides the "fine" synchro data as will be described below. Precise timing is achieved by converting the sine wave to an alternating square wave of like period. This reference square wave is applied to a counter which in turn controls switches which supply the variable d.c. signal to the dual slope integrator (which is controlled so as always to start from zero) for a fixed number of periods followed by the reference d.c. signal, in the opposite sense, for a like (or substantially like) number of periods. Since the integration rate of the integrator is constant, the magnitude of its output will vary as a function of the value of the variable d.c. or altitude signal and since the slope of the integrator output in response to the reference d.c. signal is constant, the instant that the output of the integrator returns to zero will determine the exact time ratio between the variable d.c. and the fixed d.c. Thus, if the time period or count that the integrator receives the variable d.c. signal, and the time period that it receives the reference d.c. signal are the same, or essentially the same, and each corresponds to "full scale" altitude, the instant the integrator output returns to zero will represent the instantaneous altitude and may be used to sample the oscillator sine wave and cosine wave to thereby provide d.c. signals proportional respectively to the "fine" sine and cosine values of the variable d.c. or altitude signals.

The "coarse" value of the variable d.c. or altitude signal is provided by a second sine/cosine oscillator having a frequency corresponding to the conventional 1/27 ratio commonly used in fine/coarse synchro systems. This coarse sine/cosine oscillator is controlled to start at a precise time by means of a zero crossing sample pulse provided by the counter responsive to the sine component of the fine oscillator. At the start of the first count (dual slope integrator switched to received variable d.c. signal), the coarse sine/cosine oscillator is set to an initial condition where sine = 1 and cosine = 0. At a predetermined number of counts thereafter the coarse oscillator is started. If negative or below sea level, altitudes could be ignored, the coarse oscillator would be started at a point such that the positive going sine wave would cross zero precisely at the start of the second count (dual slope integrator switched to receive the reference d.c. signal). However, since negative altitudes must be accommodated, the coarse oscillator is started at a point such that the coarse sine wave crosses zero (corresponding to zero altitude) at a point slightly after the start of the second count. As with the fine oscillator, the sample pulse output of the dual slope integrator is also used to sample the coarse oscillator output to thereby provide d.c. signals proportional to the coarse sine and cosine values respectively of the variable d.c. or altitude signal.

Each of the fine sine/cosine and coarse sine/cosine d.c. signals are modulated at the desired synchro transmission frequency, typically 400 Hz, and then applied directly to respective fine and coarse synchro resolvers or to Scott T transformers to provide resultant fine and coarse signals in three-wire synchro signal format for transmission to utilization devices.

DESCRIPTION OF THE PREFERRED EMBODIMENT

Figure 1A:
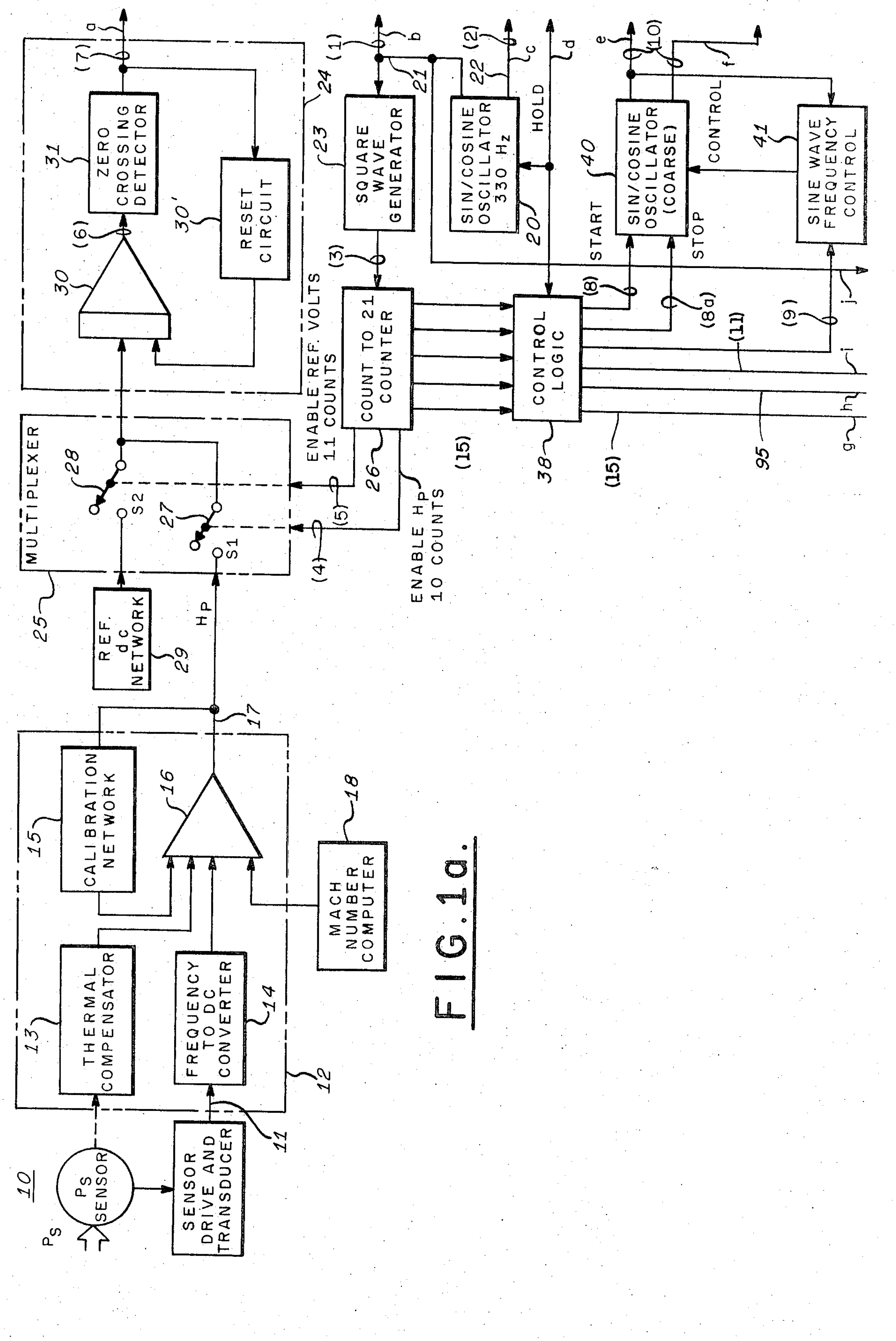
FIGS. 1*a*, 1*b*, 1*c* and 1*d* constitute a schematic block diagram of the air data system of the present invention.
Figure 1B:
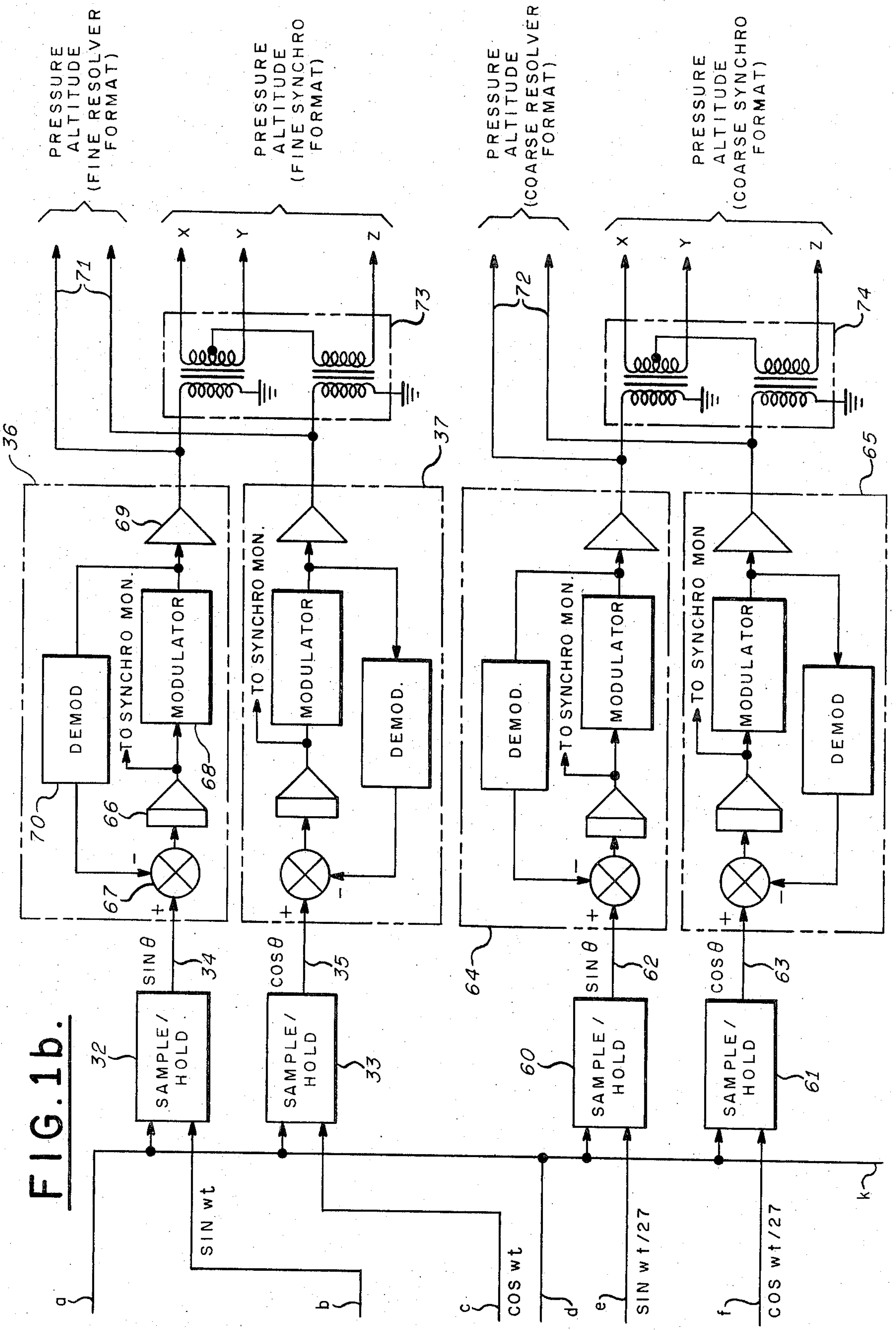
Figure 1C:
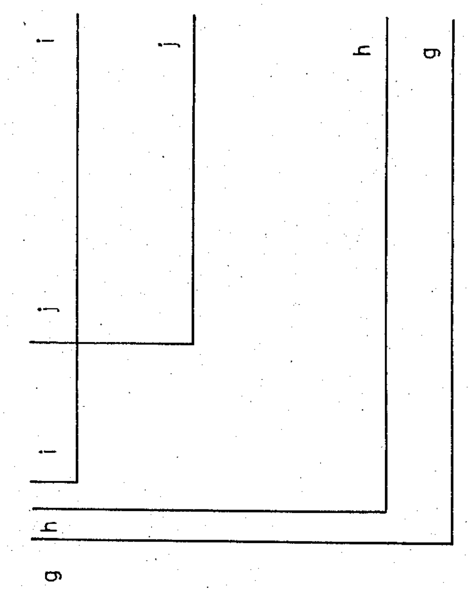

Referring now to FIGS. 1*a* and 1*b*, the source of pressure altitude data comprises a vibrating diaphragm pressure sensor 10, which may be of the type disclosed in the above-referenced Frische patent, the output 11 of which is an a.c. signal having a frequency as a function of sensed pressure. A calibration circuit 12 includes a temperature compensator 13, a frequency-to-d.c. converter 14, a calibration network 15, and a summing amplifier 16. The thermal compensator may include a thermal sensor within the sensor 10 for compensating any effect due to changes in ambient temperature on the sensor. The frequency-to-d.c. converter 14 may be conventional but preferably is of the type disclosed in Applicant's Assignee's copending U.S. Pat. application Ser. No. 330,129, filed Feb. 6, 1973, in the name of George C. Haas entitled "Linear Frequency to D.C. Converter Circuit." This d.c. output and the thermal compensator output are applied to the summing amplifier 16, the output 17 of which is fed back to its input through calibration network 15. The purpose of the calibration network 15 is to linearize the d.c. signal linearly proportional to sensor frequency to a d.c. signal linearly proportional to pressure altitude. In order to enhance the accuracy of the air data system of the present invention, it may be desirable to include a further correction term proportional to Mach Number to compensate for the effects of Mach Number on the static source for the sensor 10. Thus, a source 18 of signal proportional to Mach Number is supplied as a correction signal to the input of summing amplifier 16.

The basic timing reference for the system is a sine/cosine oscillator 20 tuned to a convenient frequency, depending upon the desired resolution characteristic represented by the system cycle or refresh period. For example, in one application a frequency of about 330 Hz was found to be satisfactory. The sine wave output of oscillator 20 appears on lead 21 while the cosine wave output appears on lead 22. These signals are represented in curves (1) and (2) respectively of the timing diagrams of FIG. 2. The sine wave output has been chosen for convenience as the timing reference for the system although the cosine wave could similarly be used. In order to provide very precise timing control, the sine wave output of oscillator 20 is converted to a square wave by a conventional squaring amplifier or square wave generator 23. The output of generator 23 is illustrated by curve (3) of FIG. 2 and has a period $1/f$ where $f$ is the frequency of oscillator 20.

As stated above, the variable d.c.-to-synchro signal converter of the present invention is based on the concept of converting the ratio of the variable d.c. signal and a reference d.c. signal to a time period ratio wherein the time period reference is the sine wave output of the oscillator 20. In principle, and as applied in an air data computer for providing fine/coarse synchro data proportional to aircraft altitude, and ignoring for the moment negative altitude, i.e., altitudes below sea level, the variable d.c. voltage proportional to instantaneous altitude is integrated over a period of time corresponding to a desired full scale reading of altitude, e.g., from zero to say 50,000 feet which corresponds to a predetermined number of oscillator cycles. A reference d.c voltage of opposite polarity from that of the variable d.c. voltage but whose magnitude or amplitude also corresponds to said full scale reading is immediately integrated by the same integrator, the reference d.c. voltage being applied to the integrator for a like period of time, i.e., corresponding to the same number of oscillator cycles. Since the slope of the integrator output in response to the variable d.c. signal varies with the magnitude thereof, i.e., actual altitude, over a period of time corresponding to full scale altitude and the slope of the integrator output in response to the reference d.c. signal the magnitude of which is proportional to full scale altitude is constant, the instant at which the integrator output goes to zero represents the ratio of the magnitude of the variable d.c. voltage or actual altitude to the reference d.c. voltage or full scale altitude in terms of the time period ratio of the number of oscillator cycles corresponding to actual altitude to the number of cycles corresponding to full scale altitude.

The foregoing may be illustrated mathematically as follows, reference being made to curves (1) through (6) of FIG. 2. The variable d.c. voltage $E_S$ proportional to altitude is integrated for a predetermined period, $T_1$, say 10 sine wave cycles of the reference oscillator, which period corresponds to full scale altitude. The slope of the output of the integrator, which has a predetermined time constant, $T_3$, is variable, depending upon instant actual pressure altitude, $$\text{Slope} = E_S/T_3$$

so that the magnitude of the integrator output after time $T_1$ is $E_S T_1/T_3$. The reference d.c. voltage, $E_4$, proportional to full scale altitude is applied to the integrator for a like period $T_1$. Since the reference voltage $E_R$ is constant, the output of the integrator in response thereto has a constant slope, $$\text{Slope} = E_R/T_3$$

Therefore, if the variable d.c. signal is applied to the integrator for a time period $T_1$ and the reference d.c. signal is immediately thereafter applied to the integrator, its magnitude corresponding to the time period $T_1$, the instant, $T_2$, that the integrator output goes to zero is variable and proportional to the ratio of the variable to the reference d.c. voltages, $$T_2 = E_S T_1/T_3/E_R/T_3 = E_S T_1/E_R$$

The time period $T_1$ is determined by a predetermined number, say 10, of sine wave cycles of the oscillator. Thus, if the oscillator sine/cosine wave outputs of the reference oscillator are considered "fine" altitude data and are sampled at the instant $T_2$, the instantaneous values of the sine and cosine voltages are proportional to altitude as follows:

Fine sampled data = $\begin{cases} \text{Sin}(\omega T_2)=\text{Sin}(2\pi\ E_S\ 10/E_R=\text{Sin}(20\pi\ E_S/E_R) \\ \text{Cos}(\omega T_2)=\cos(20\pi\ E_S/E_R) \end{cases}$ It should be noted that the oscillator frequency cancels and the output data is dependent only on voltage ratios so that the oscillator need not be a precision device and may be allowed to slowly drift without affecting the system accuracy.

Coarse altitude data may be obtained by means of a second sine/cosine oscillator having a frequency which is a predetermined fraction of the fine data frequency, typically one twenty-seventh thereof. If the coarse oscillator is controlled such that the positive going sine wave crosses zero at the instant the reference d.c. is applied to the integrator and sampled at the same instant $T_2$, the instantaneous values of the coarse oscillator outputs are as follows, Coarse sampled data $\begin{cases} \sin(20/27\ \pi\ E_S/E_R) \\ \cos(20/27\ \pi\ E_S/E_R) \end{cases}$ Since, altitudes below sea level must be indicated on most standard altimeters, the timing of the coarse data is modified slightly. This modification is accomplished by adding a single cycle to the time period that the reference d.c. signal is applied to the integrator and controlling the start of the coarse oscillator such that its positive going sine wave crosses zero slightly after the application of the reference d.c to the integrator. In one application of the present invention, such delay amounted to one quarter of a fine cycle which corresponded to 1,250 feet such that the coarse data started at 1,250 feet below sea level, sufficient to account for all areas of the earth at maximum atmospheric pressures. Thus, the coarse sampled data equations may be rewritten:

Coarse Sampled Data = $\begin{cases} \sin(20/27\ \pi\ E_S/E_R + \pi/2/27) \\ \cos(2\pi\ E_S/E_R + \pi/2/27) \end{cases}$ where $\pi/2/27$ is the described delay.

A preferred embodiment of an implementation of the foregoing concept as applied to aircraft altimetry will now be described, reference again being made to FIGS. 1*a* and 1*b*.

The principle element of the converter is a dual slope integrator 24 responsive to the output of a multiplexer 25 which is controlled by a counter 26 responsive in turn to the square wave produced by square wave generator 23 corresponding to the sine output of oscillator 20. Multiplexer 25 comprises a pair of switches 27 and 28 connected respectively to the variable d.c. voltage proportional to instantaneous altitude on lead 17 and a reference d.c. voltage produced by reference d.c. network 29, the magnitude of which corresponds to some maximum, a full scale altitude. Although illustrated as conventional mechanical switches, switches 27 and 28 may be solid state devices such as for example conventional FET type devices.

Figure 2A:
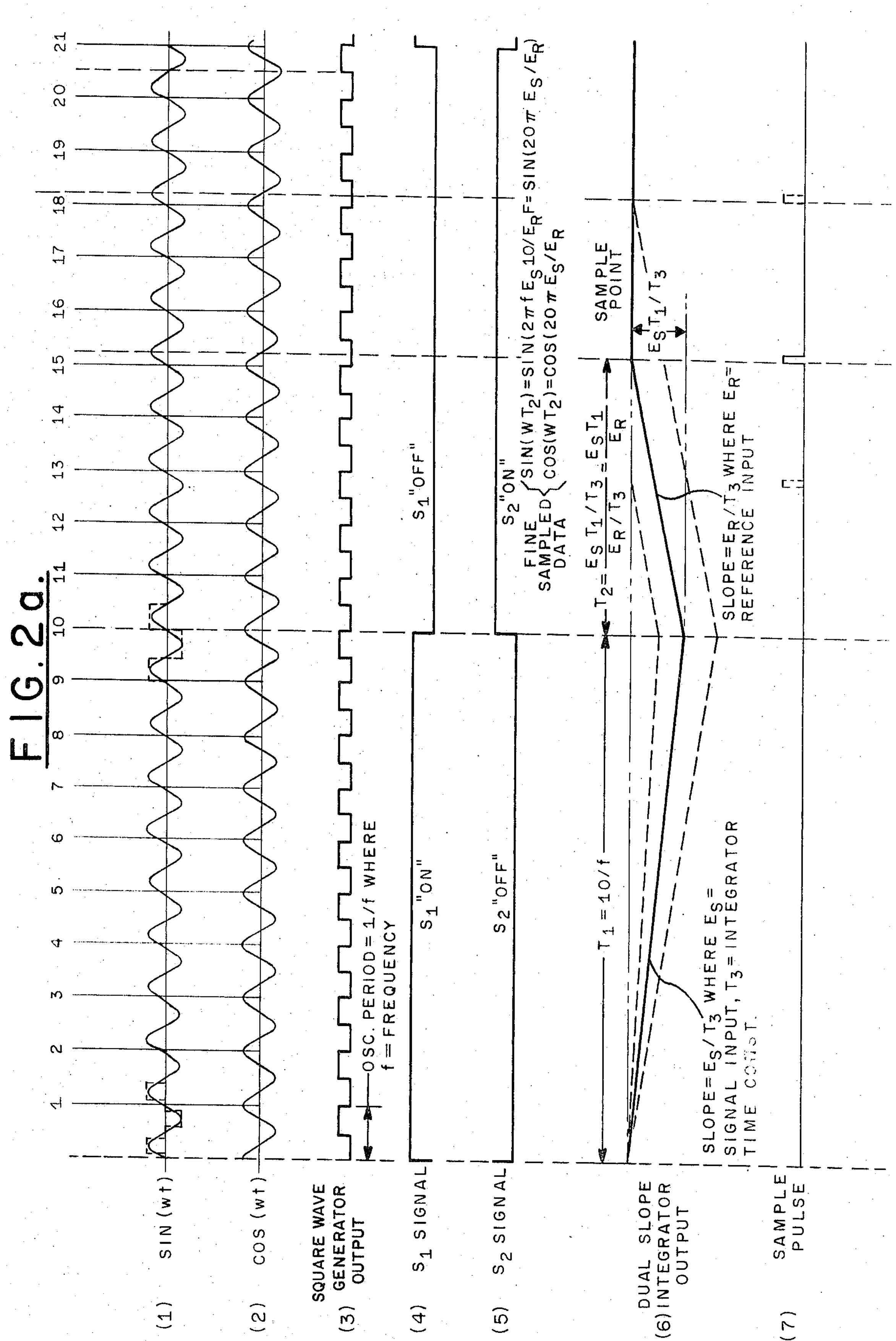
FIGS. 2*a* and 2*b* are a series of timing curves useful in disclosing the operation of the system.
Figure 2B:
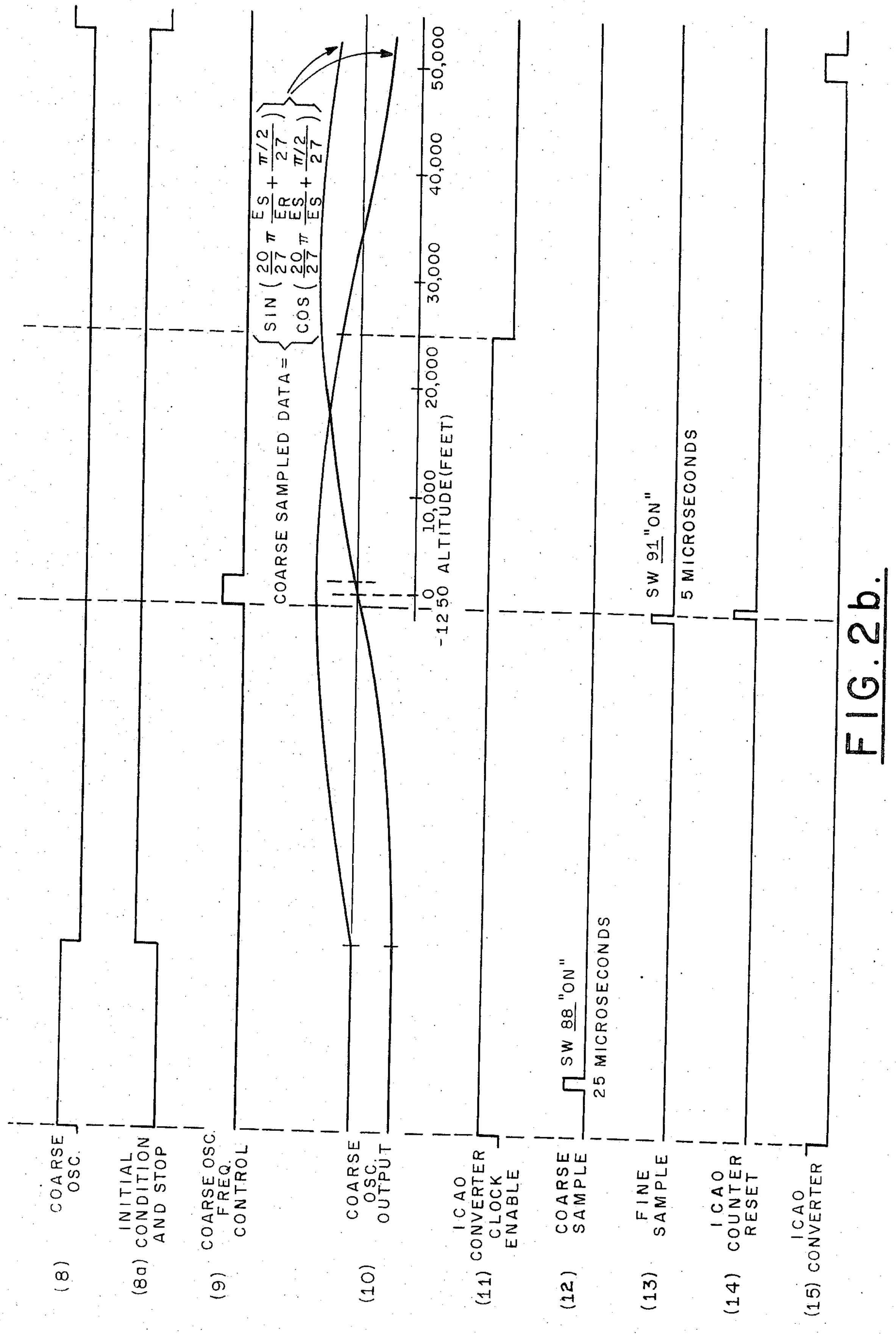

Counter 26 is a count to 20–1 counter and is the system sequence timer and comprises a conventional binary counter adapted to count 21 periods of the square wave generator 23 output, which 21 counts constitute the system cycle or "refresh period," see curves (4) and (5) of FIG. 2. During the first 10 counts, the period $T_1$ of curve (6) of FIG. 2, switch 27 is closed and the variable d.c. altitude signal on lead 17 is applied to a conventional integrator 30 of dual slope integrator 24. The output of integrator 30 will decrease at a slope dependent upon the magnitude of the variable d.c. signal (altitude signal 17 from sensor 10) and the integrator time constant whereby at the end of the 10th count, the magnitude of the integrator output will be proportional to the magnitude of the variable d.c. times the time period $T_1$ divided by the integrator time constant. At the end of the tenth count, counter 26 switches switch 27 open and switch 28 closed and the switches remain in this condition for the next 11 counts of the counter or at least until the integrator output returns to zero. During this time interval the reference d.c. voltage 29 is now applied to integrator 30 but in a sense opposite to that of the variable d.c. signal so that the integrator output begins to increase. Since the reference d.c. voltage is always the same, the reverse slope of the integrator output will be constant. In FIG. 2, curve (6) the two dotted upper and lower curves illustrate the operation of the dual slope integrator 24 at lower and higher altitudes respectively.

The output of integrator 30 is applied to a conventional zero crossing detector 31 so that when the integrator output reduces to zero, the detector supplies an output or sampling pulse. The sample pulse can be used to reset the integrator to zero via the reset circuit 30′ or alternatively, the sample pulse may be used to open switch 28 to assure the integrator will be zeroed for the start of the next cycle. Thus, the sampling pulse will occur at the time $T_2$ which varies in accordance with the ratio of the magnitude of the variable d.c. and the reference d.c. voltages in terms of the number of oscillator cycles corresponding to time $T_2$ and the number of cycles corresponding to the reference time base $T_1$ (see curves (1) and (7) of FIG. 2). The sampling pulse, curve (7) of FIG. 2, provided by detector 31 is applied as the enabling pulse to a pair of sample and hold circuits 32 and 33, responsive to the sine and cosine outputs 21 and 22, respectively, of oscillator 20. The sample and hold circuits 32 and 33 are conventional and are adapted to supply a direct current output proportional to the value of the signal input at the instant the enabling pulse is applied. Therefore, at the instant $T_2$, the sampling pulse is applied to the sample and hold circuits 32 and 33, the respective outputs 34 and 35 thereof are d.c. voltages proportional respectively to the instantaneous sine and cosine values of pressure altitude. These signals are applied respectively to modulators 36 and 37 where they are converted to corresponding modulated a.c. signals as will be described below. If desired, in order to achieve a positive enabling of the sample and hold circuits 32 and 33, the sampling pulse may also be supplied to oscillator 20 to momentarily hold it at its then achieved sine-cosine values. The holding time need only be very short, e.g., 100 microseconds and this momentary hold will not materially effect the system accuracy since any slight delay in the oscillator output will only delay the start of the next system cycle.

As stated above, count to twenty-one counter 26 is the basic sequence timing reference for the system and as such supplies certain control logic pulses at discrete counts of the basic sine wave time reference provided by oscillator 20. Thus, counter 26 supplies binary count signals to control logic 38 which is designed to produce discrete logic control voltages or pulses at predetermined counts of the counter. These are illustrated by the curves (8), (9), (11) and (12) of FIG. 2 and their operation will now be described.

Previously, it was stated that the coarse synchro data was supplied by a second oscillator having a frequency which is a predetermined fraction of the fine data frequency of oscillator 20. Conventionally, this frequency is 1/27 of the fine data frequency. This source of coarse data frequency is coarse oscillator 40 which supplies coarse sine and cosine waves. In order that the coarse data be precisely synchronized with the fine data, the coarse oscillator is controlled by the counter 26. Also, as stated above, it is desired that the positive going coarse sine wave be controlled so as to cross zero slightly after the start of the full scale fine sine wave to accommodate below sea level altitudes. This control is accomplished in two steps. First, the coarse oscillator 40 is preconditioned at the start of each system cycle so that the sine value is 0 and the cosine value is 1. Furthermore, inasmuch as it is critical that the coarse oscillator 40 positive going sine wave crosses zero precisely at zero altitude, its frequency must be further controlled by the counter logic 38 through sine wave frequency control 41.

Figure 3:
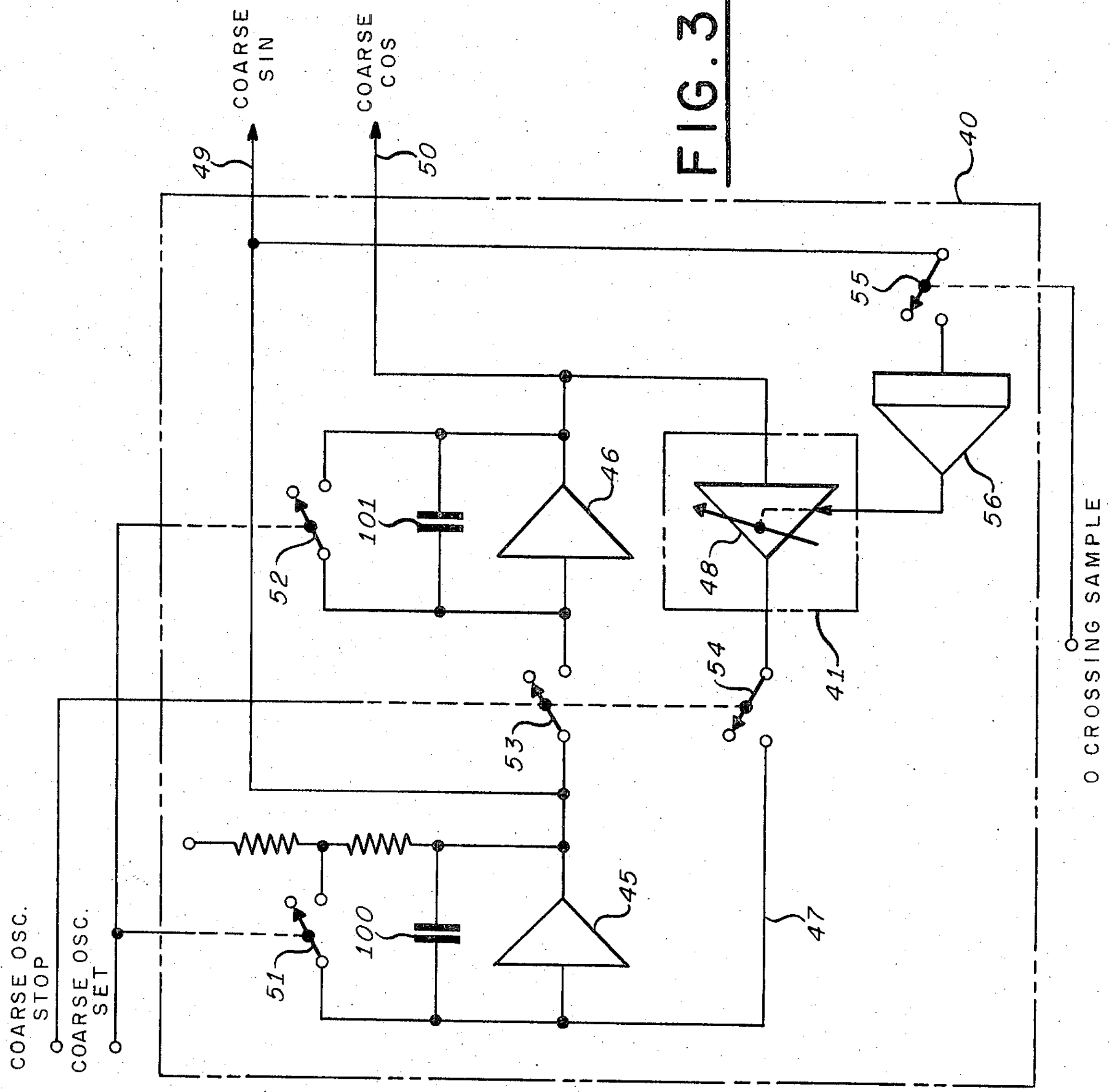
FIG. 3 is a schematic detail of a portion of the system of FIGS. 1*a* and 1*b*.

The coarse oscillator 40 and its zero crossing control 41 are schematically illustrated in FIG. 3. The basic oscillator is conventional comprising a pair of series connected integrator amplifiers 45, 46 having a full loop feedback connection 47 to maintain the system in oscillation. This feedback connection 47 includes means for varying the oscillator frequency schematically illustrated as a variable gain amplifier 48. The sine wave output 49 is taken from the output of the first integrator 45 while the cosine wave is taken from the output 50 of second integrator 46. The oscillator elements are selected so that its nominal frequency is in the neighborhood of one twenty-seventh the frequency of the fine oscillator 20 but which frequency can be varied slightly by means of frequency control 41 for purposes to be described below.

The coarse oscillator 40 is preconditioned at the beginning of each system cycle by means of a condition gate illustrated by curve (8) of FIG. 2. This gate controls switches 51, 52 in each of the capacitive feedback loops of the integrators 45, 46, respectively, which switches are illustrated as mechanical switches but which in practice may be electronic FET type switches. Switch 51 shorts the integrator feedback capacitor 100 of integrator amplifier 45 and applies a predetermined fixed voltage to its input so that its output reprints a "1," corresponding to the peak amplitude of the oscillator while switch 52 shorts out the integrator feedback capacitor 101 of integrator 46 thereby causing its output amplitude to go to zero. This initial condition is maintained by means of the stop gate illustrated by curve (8*a*) of FIG. 2 which opens switches 53 and 54 in the connection between amplifiers 45 and 46 and oscillator feedback connection 47, respectively. As stated, the coarse oscillator 40 must be precisely started so that the positive going sine output crosses zero at a point, relative to the start of the full scale sine wave from the fine oscillator 20, corresponding to zero altitude. For this purpose, the control logic 38 controlled by counter 26 is designed to turn off gate (8) and turn on gate (8*a*) precisely at a count of 3.5 cycles of sin ($\omega t$) (curve (1) of FIG. 2). Since in the specific embodiment illustrated, a full coarse oscillator cycle is not required and a quarter wave of the fine sine wave is difficult to pinpoint, some means of assuring that positive going sine wave crosses zero at a point corresponding to zero altitude is required. This is accomplished by a "zero crossing" sample gate switch 55 and integrator 56 arrangement schematically illustrated in FIG. 3. The zero crossing gate is illustrated by curve (9) of FIG. 2. This gate is initiated by counter logic 38 precisely at the count of 10 and is terminated precisely one-half fine sine wave cycle later. During this time period switch 55 is closed and the coarse sine wave output from coarse oscillator 45 is applied to the integrator 56. If the coarsè sine wave crosses zero precisely at the middle of the gate period equal positive and negative voltages will be applied to the integrator and its output will be zero. However, if the coarse sine wave does not cross zero at the middle of the gate the resultant integrator output will adjust the gain of feedback amplifier 48 to thereby adjust the frequency of the oscillator 40 in a direction to balance the integrator output. It will be understood that this frequency adjustment may require a number of system cycles to accomplish the zero crossing adjustment.

Thus, with the foregoing arrangement coarse sine wave and cosine wave signals are provided on leads 49 and 50. These a.c. signals are applied respectively to coarse sample and hold circuits 60 and 61 where, as in the case of fine sample and hold circuits 32 and 33, the sampling gate output of crossover detector 31 is used to enable the same and clamp the then existing values of the coarse sine and cosine waves, whereby to provide on output leads 62 and 63 direct current voltages respectively proportional to the coarse sine and coarse cosine values of altitude. Also, as in the case of the fine data, these voltages are applied to modulators 64 and 65 to provide corresponding a.c. signals having magnitudes proportional respectively to the coarse sine and coarse cosine values of the variable d.c. input voltage and in the present embodiment, of aircraft altitude.

The modulators 36 and 37 and 64 and 65 are all identical and therefore only modulator 36 need be described. The d.c. signal proportional to the sine of the variable d.c. input or altitude signal is applied to an integrator 66 through a summing junction 67. The integrator output is then applied to a modulator 68 excited with a reference alternating current supply (not shown) having a frequency corresponding to the frequency of the utilization system receiving the altitude signal, which frequency is typically 400 Hz in aircraft applications. The output of the modulator 68 is then suitably amplified in amplifier 69. A modulator feedback loop couples the output of the modulator 68 back to summing junction 67 through a demodulator 70. In operation, the input d.c. proportional to the sine of aircraft altitude sets the level of the output of integrator 66 to a corresponding value after which this signal is converted to a 400 Hz a.c. signal having an amplitude and phase proportional to the magnitude and sign of the input d.c. In order to improve the accuracy of the modulator output and to compensate for any small variations in the a.c. supply amplitude and or drift of the modulator 68, the modulator output is degeneratively fed back to the integrator 66 input to adjust its output signal level accordingly.

The fine and coarse sine/cosine a.c. outputs of modulators 36, 37, 64 and 65, respectively, may be used directly in resolver format, i.e., as inputs 71, 72 to fine/-coarse resolvers forming part of the altitude utilization system or if desired or required may be converted to three-wire synchro format through two-wire to three-wire circuitry 73, 74, such as Scott T transformers, as shown, or other equivalent solid state circuits.

Figure 1D:
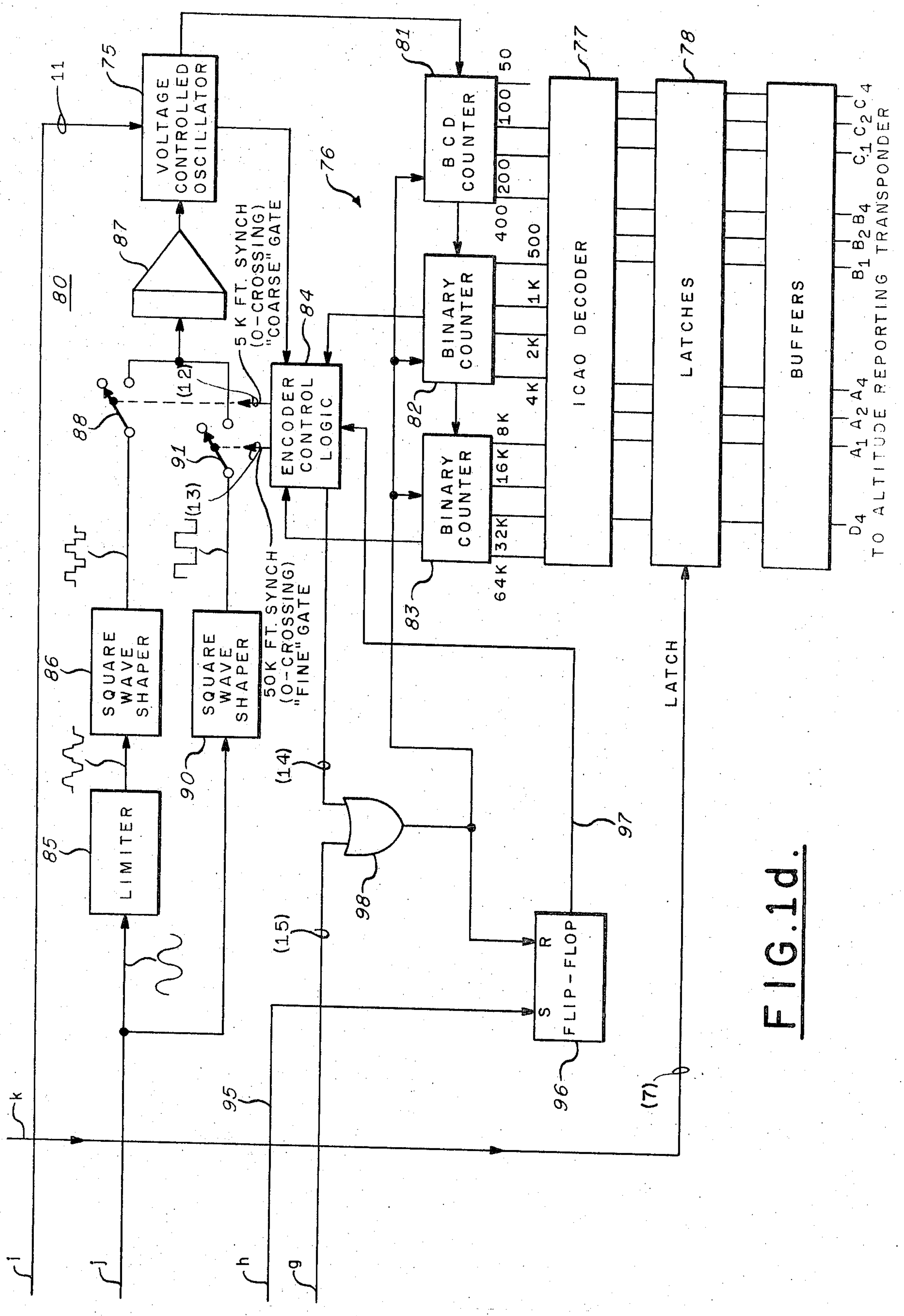

As mentioned above, the pressure altitude signal is converted to a digital format for altitude reporting purposes. This digital format is that required by the ARINC standard for subsonic air data systems, known as ARINC Characteristic No. 565, in short, the above-mentioned ICAO format. The altitude digitizer is shown in FIG. 1*d*. In general, the time base provided by the sine/cosine fine oscillator 20 starts and stops a high frequency oscillator or clock 75, the output of which is counted in counter 76 which is filled completely and checked for alignment with the fine oscillator sine output 20 during the initial operation of the dual slope integrator 24 by means of a synchronization technique to be described. The time base is then converted to altitude, by restarting the counter 76, with a least significant bit value of 100 feet. The Moa Gilam or ICAO decoder 77 converts the altitude count to ICAO code, the output of which is latched by latches 78 by the same sample pulse which enabled the coarse and fine sample and hold circuits 62, 63 and 32, 33 at actual altitude. The latched output of decoder 77 is supplied in IACO format to the aircraft transponder (not shown) which reports aircraft altitude to ATC.

Since the reported altitude must correspond precisely with actual altitude, the counter clock or oscillator 75 must be precisely synchronized with the fine sine/cosine oscillator 20. This is accomplished during the time the dual slope integrator 24 is integrating the d.c. altitude signal from sensor 10, i.e., the first 10 cycles of the fine oscillator sine wave, by the synchronizing circuitry generally indicated at 80 in FIG. 1*d*. As shown, the clock 75 is a voltage controlled oscillator having a nominal frequency proportional to the frequency of oscillator 20; in one embodiment the oscillator 20 frequency was 330 Hz and the counter clock 75 frequency was nominally 33 KHz. The technique for precisely synchronizing these oscillators is similar to that for synchronizing the coarse oscillator 40 to the fine oscillator 20 in that synchronization may require several system refresh cycles.

Referring to FIG. 2*a*, it will be noted that the clock oscillator 75 must be precisely synchronized with the completion of the tenth cycle of the fine altitude sine wave (1) which corresponds to the start of the altitude measure. Due to the rather large frequency ratio between these two oscillators, their synchronization is achieved by a fine/coarse technique to eliminate any possible ambiguity. Coarse synchronization is achieved as follows. The high frequency clock 75 is enabled, curve (11) of FIG. 2 with the start of the fine oscillator sine wave (1) and the counter 76 begins to count the high frequency pulses. Binary coded decimal counter 81 counting from 50 to 499 fills and overflows into binary counter 82 which counts from 500 to 7,999. Since one complete fine sine wave cycle corresponds to 5,000 feet of altitude, if the oscillators are precisely synchronized, at the end of a count of five thousand from binary counter 82, the fine sine wave (1) signal should be at zero. Therefore, at the count of 5,000, a coarse sample gate having a width of about 25 microseconds shown magnified in curve (12) of FIG. 2, is generated in encoder control logic 84 which is responsive to oscillator 75 and the fine sine wave (1) is sampled at this point of time. For this purpose, the fine sine wave from oscillator 20 is applied to a limiter 85 and a squaring amplifier 86, the output of which is coupled with an integrating amplifier 87 through switch 88 controlled by the 5,000 ft coarse sample gate from encoder control logic 84. The latter switch is preferably an FET type solid state switch although herein shown schematically. Limiter 85 serves to shape the square wave output of square wave amplifier 86 such that there is a dead zone of a predetermined width about the zero value of the sine wave as illustrated by the dotted curve of waveform (1) at cycle 1 of FIG. 2. Thus, if the 5,000 ft sample gate closes switch 88 within the deadband of the square wave, the oscillators are "coarse" synchronized and no signal is applied to integrator 87. However, if the oscillators are not coarse synchronized, when the 5,000 ft gate closes switch 88, a portion of the square wave voltage will be applied to integrator 87, the magnitude and polarity of which will be dependent upon the time lead or lag between the occurrence of the gate and the fall or rise of the square wave. The resulting output of integrator 87 will therefore be supplied to voltage controlled oscillator or clock 75 and adjust its frequency and hence the time of occurrence of the coarse gate in a sense to bring the coarse gate within the limited square wave deadzone.

Fine synchronization of the oscillators 20 and 75 is accomplished in a similar manner during the first 10 cycles of operation of dual slope integrator 24. Counter 76 continues to count the output pulses of the high frequency oscillator 75, binary counter 82 overflowing into binary counter 83 and at the count of 50 thousand, a 50K foot fine sample gate is generated in logic 84 which gate is used to sample the fine sine wave from oscillator 20. This fine sample gate is waveform (13) of FIG. 2. For this purpose the fine sine wave is applied to squaring amplifier 90 the output of which is applied to integrator 87 through fine sample switch 91 controlled by the fine sample 50K foot gate. In this instance, the fine square wave is full width as illustrated by the dotted line curve in waveform (1) at cycle 10 in FIG. 2. The end of the 10th cycle of the fine sine wave corresponds to 50,000 feet, i.e., the sine wave crosses zero at a point corresponding to 50K feet. Thus, if the oscillators 20 and 75 are fine synchronized, the fine gate will equally straddle the zero crossing of the fine sine wave and switch 91 will pass equal positive and negative portions of the square wave from square wave amplifier 90 resulting in no net output from integrator 87. If the oscillators are not fine synchronized, switch 91 will pass unbalanced portions of the square wave to integrator 87, the resultant output of which adjusts voltage controlled oscillator or clock 75 in a sense to move the 50K foot gate so as to equalize the portions of the square wave passed to integrator 87. As stated above, this synchronization process may require a number of system refresh cycles to complete.

The actual altitude count starts precisely at the beginning of the 11th cycle of the sine wave (1). However, during this actual count, the synchronization pulses of curves (12) and (13) must be inhibited. This is accomplished as follows. At the start of the system refresh cycle, i.e., the first cycle of the fine sine wave (1), control logic 38 supplies a short pulse of, say 200 microseconds, on lead 95 (curve not shown in FIG. 2) which pulse sets conventional flip-flop 96 the "set" output 97 of which is supplied to encoder logic 84 which in turn enables the 5K ft SYNCH (0-crossing) "COARSE" gate and the 50K ft SYNCH (0-crossing) "FINE" gate controlling switches 88 and 91 respectively so that synchronization may take place as described above. Precisely at the count of 50,000 from counter 83, logic 84 supplies a short pulse, curve (14) of FIG. 2 identified as the counter reset pulse. This pulse is supplied to counter 76 through "OR" gate 98 to reset it to zero and also to flip-flop 96 to reset it, i.e., to change the state of its output 97. This "reset" output disables the fine sample gate, waveform (13) and the coarse sample gate, waveform (12) and thereby inhibits the operation of switches 88 and 91 so that no change in oscillator 75 frequency occurs during the actual altitude count. At the end of the actual altitude count, counter 26 supplies a pulse, curve (15) of FIG. 2, through control logic 38 indicating that the count is complete. This pulse is supplied to "OR" gate 98 and serves to reset the counter 76 back to zero in preparation for the next system refresh cycle.

The contents of the counter 76 during the altitude count is applied to a conventional ICAO (Moa Gilam) decoder 77 to provide the altitude reporting code defined in the above-referenced ARINC publication, this altitude information being supplied to the altitude reporting transponder aboard the aircraft for transmission to ATC. The count continues until the altitude sample pulse, waveform (7), is generated by dual slope integrator 24 at which time the contents of the counter 76 is latched by latches 78 and simultaneously the high frequency clock 75 is turned off by the closing of clock enable gate from control logic 38. At the end of each system cycle the control logic 38 supplies an ICAO converter reset pulse, illustrated by waveform (15) of FIG. 2, which resets the counter 76 to zero in preparation for the next system cycle.

It will be understood that inasmuch as the actual altitude count in practice includes negative or below sea level altitudes, the actual count from counter 76 used for establishing the fine and coarse gates during the synchronization period will be decreased by the below sea level count of 1,250. Thus, the coarse synchronization gate in practice occurs at a count of 3,750 feet from counter 76 rather than the even 5,000 feet used above for conveying an understanding of the system operation. Likewise, the fine synchronization gate in practice occurs at a count of 48,750 feet from counter 76 rather than the illustrative 50,000 feet.

While the invention has been described in its preferred embodiment, it is to be understood that the words which have been used are words of description rather than limitation and that changes may be made within the purview of the appended claims without departing from the true scope and spirit of the invention in its broader aspects.

We claim:

1. Apparatus for converting a variable direct current signal to a corresponding sine/cosine signal format comprising, means for providing said variable direct current signal, oscillator means for providing a reference a.c. time base signal, means providing a reference d.c. signal, integrator means, counter means responsive to said reference a.c. signal for alternately supplying said variable d.c. signal and said reference d.c. signal to said integrator means in opposite senses for predetermined substantially equal time periods and for providing a sampling pulse at a time period corresponding to the ratio of said d.c. signal voltages, and sample and hold means responsive to said time base a.c. signal and said sampling pulse for supplying d.c. signals proportional respectively to the instantaneous sine and cosine values of said voltage ratio and hence proportional to said variable d.c. signal.

2. The apparatus as set forth in claim 1 further including modulator means responsive to said d.c. sine and cosine signals for providing amplitude modulated a.c. signals proportional to said sine and cosine values of said variable d.c. signal.

3. The apparatus as set forth in claim 1 wherein said oscillator means provides sine and cosine signals of like periods and said counter means is responsive to one of said signals.

4. The apparatus as set forth in claim 1 wherein said integrator means includes zero crossover detector means responsive to the output thereof, said sample pulse being generated when the output of said integrator is zero.

5. The apparatus as set forth in claim 1 further including, second oscillator means responsive to said counter means and having a frequency proportionally related to said reference oscillator means, and further sample and hold means responsive to said sampling pulse and said second oscillator means for providing second d.c. signals proportional respectively to the instantaneous sine and cosine values of said voltage ratio whereby said second sine and cosine values bear said predetermined ratio to said first mentioned sine cosine values.

6. The apparatus as set forth in claim 5 further including second modulator means responsive to said second d.c. sine and cosine signals for converting the same to a.c. signals proportionally related to said first mentioned a.c. signals.

7. Apparatus for converting a variable direct current signal to a corresponding alternating current sine/cosine signal format comprising, a source of variable d.c. voltage signal to be converted, a source of reference d.c. voltage signal, oscillator means for providing a reference time base, means responsive to the ratio of said variable to said reference d.c. voltage signals and controlled by said oscillator means for converting said voltage ratio to a time period ratio, and means responsive to said time period ratio for sampling said oscillator whereby to provide signals proportional at that instant to the sine and cosine values of said oscillator time base and hence proportional to said variable d.c. signal.

8. The apparatus as set forth in claim 7 further including modulator means responsive to said sine and cosine values for converting the same to an alternating current synchro signal format.

9. The converter apparatus as set forth in claim 7 wherein said voltage ratio to time period ratio converting means comprises integrator means and means controlled by said oscillator means for alternately supplying said variable and reference d.c. voltages thereto in opposite senses, the instant the output of said integrator returns to zero being proportional to said time period ratio.

10. The apparatus as set forth in claim 9 wherein said sampling means is responsive to the output of said integrator means.

11. The apparatus as set forth in claim 10 wherein said oscillator means provides a reference sine wave signal and a cosine wave signal, and wherein said sampling means samples the instantaneous value of said sine and cosine waves to provide d.c. voltages respectively proportional thereto.

12. The apparatus as set forth in claim 8 wherein said converter means responsive to said d.c. sine and cosine voltages comprises modulator means responsive thereto and further means responsive to the alternating sine/cosine outputs of said modulator means for converting the same to three-wire synchro signal format.

13. Variable direct current to sine/cosine signal converter apparatus comprising, means for providing said direct current signal variable over a range of values, oscillator means for providing reference sine and cosine a.c. signals, means providing a reference d.c. signal having a magnitude corresponding to the maximum of said range of values, integrator means, counter means responsive to one of said oscillator signals for supplying said variable d.c. signal in a first sense to said integrator means for a period corresponding to said maximum range and for thereafter supplying said reference d.c. signal to said integrator means in an opposite sense for a substantially like period, zero crossing detector means responsive to the output of said integrator means for supplying a signal upon return of said integrator output to zero, and means responsive to said reference sine and cosine signals and to said zero crossing detector signal for providing d.c. signals respectively proportional to the instantaneous values of said sine and cosine signals then obtaining.

14. The converter apparatus as set forth in claim 13 further including modulator means responsive to said d.c. sine and cosine signals for providing corresponding amplitude modulated a.c. signals.

15. The converter apparatus set forth in claim 14 further including circuit means responsive to said a.c. signals for converting the same to three-wire synchro signal format.

16. The converter apparatus as set forth in claim 13 wherein said counter period corresponds to a predetermined number of cycles of one of said oscillator signals.

17. The converter apparatus as set forth in claim 13 further including, second oscillator means for providing second sine and cosine a.c. signals bearing a predetermined frequency ratio to said first mentioned oscillator means, means responsive to said counter means for synchronizing said second oscillator means to said first oscillator means, and means responsive to said sine and cosine a.c. signals and said zero crossing detector signal for providing second d.c. signals respectively proportional to the instantaneous values of said sine and cosine signals then obtaining and bearing said predetermined ratio to said first mentioned sine and cosine signals.

18. The converter apparatus as set forth in claim 13 further including means for converting said variable d.c. signal to a digital format, said further means comprising, second oscillator means, digital counter means responsive to said second oscillator means, means responsive to said first mentioned oscillator means and said counter means for synchronizing said second oscillator means to said first oscillator means, and latching means responsive to said zero crossing detector signal for latching said digital counter means, the count then obtaining corresponding to the value of said variable d.c. signal.

19. The converter apparatus as set forth in claim 18 wherein said second oscillator is synchronized to said first oscillator during said first mentioned period and said digital counter is latched during said second mentioned period.

20. An all solid state altimeter apparatus for aircriaft comprising, an altitude sensor means for providing a variable frequency signal proportional to instantaneous altitude, means for converting said variable frequency signal to a corresponding variable direct current signal, oscillator means providing reference sine and cosine alternating signals, one of said a.c. signals having a predetermined number of cycles corresponding to a predetermined total altitude range, means providing a reference d.c. signal having a magnitude corresponding to the maximum of said altitude range, integrator means, counter means responsive to said one oscillator signal for supplying said variable d.c. signal in a first sense to said integrator means for said number of cycles and thereafter supplying said reference d.c. signal in an opposite sense to said integrator means for substantially the same number of cycles, zero crossing detector means responsive to the output of said integrator means for supplying a signal upon return of said integrator output to null, means responsive to said reference sine and cosine signals and said zero crossing detector signal for providing d.c. signals respectively proportional to the instantaneous values of said d.c. signal and cosine signals then obtaining, said last mentioned signals being proportional to the sine and cosine values of aircraft altitude.

21. The altimeter as set forth in claim 20 further including, second oscillator means responsive to said counter means for providing second sine and cosine signals bearing a predetermined ratio to said reference sine and cosine signals, and means responsive to said second sine and cosine signals and said zero crossing detector signal for providing d.c. signals respectively proportional to the instantaneous values of said second sine and cosine signals then obtaining, and one of said sets of sine and cosine signals constituting a fine measure of altitude and the other set constituting a coarse measure of altitude.

22. The altimeter as set forth in claim 20 further including means for providing a signal proportional to altitude in digital format, said further means comprising, second oscillator means, digital counter means responsive to said second oscillator means, means responsive to said first mentioned oscillator means, said first mentioned counter means, and said digital counter means for synchronizing said second oscillator means to said first oscillator means during said first number of cycles, means responsive to said first counter means for resetting said digital counter means at the start of said second number of cycles, and means responsive to said zero crossing detector signal for latching said digital counter means, the count then obtaining corresponding to aircraft altitude.

* * * * *